United States Patent [19]
Crohas

[11] Patent Number: 6,044,472
[45] Date of Patent: Mar. 28, 2000

[54] DEVICE AND METHOD FOR SUPPLYING POWER TO AN EXTERNAL DATA MEDIUM READER UNIT CONNECTED TO A COMPUTER, AND EXTERNAL READER UNIT INCLUDING THIS DEVICE

[75] Inventor: Henri Crohas, Verrieres le Buisson, France

[73] Assignee: Archos, Verrieres le Buisson, France

[21] Appl. No.: 08/880,155

[22] Filed: Jun. 20, 1997

Related U.S. Application Data

[60] Provisional application No. 60/020,546, Jul. 12, 1996, and provisional application No. 60/031,510, Nov. 27, 1996.

[30]    Foreign Application Priority Data

Jun. 21, 1996 [FR] France .................................. 96 07782

[51] Int. Cl.⁷ ....................................................... G06F 1/26
[52] U.S. Cl. ............................................................. 713/300
[58] Field of Search .......................... 395/750.01–750.08, 395/281–283; 713/300–330

[56]    References Cited

FOREIGN PATENT DOCUMENTS 6-349192   12/1994   Japan .
WO 95/08222   3/1995   WIPO .

Primary Examiner—Glenn A. Auve
Assistant Examiner—David A. Wiley
Attorney, Agent, or Firm—Young & Thompson

[57]    ABSTRACT

A device for supplying power to an external data medium reader unit, in particular a CD-ROM and/or hard disk drive, connected to a computer via a first port, in particular a PCMCIA port or a parallel port. The device includes an energy store means charged by the first power supply voltage source (Vcc), a current limiting circuit connected between the first power supply voltage source (Vcc) and the energy store means, and a circuit for raising the output voltage of the energy store means to a first voltage level required for the power supply of the logic components of the external reader unit.

18 Claims, 6 Drawing Sheets

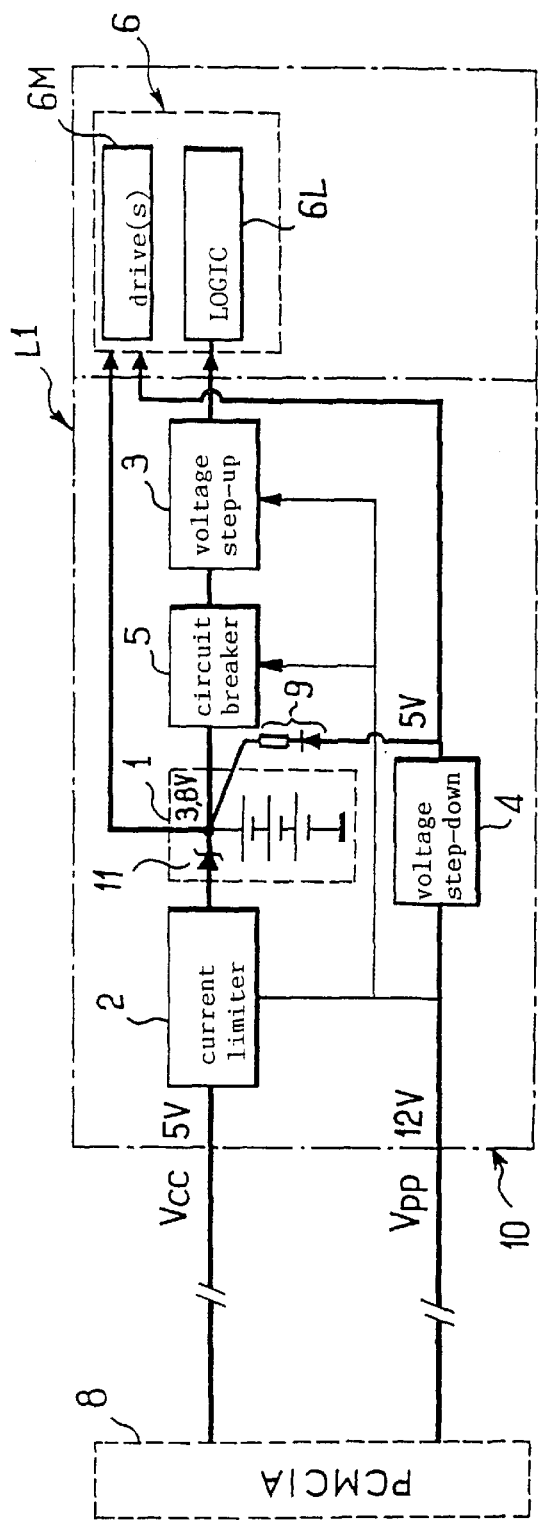
FIG_1
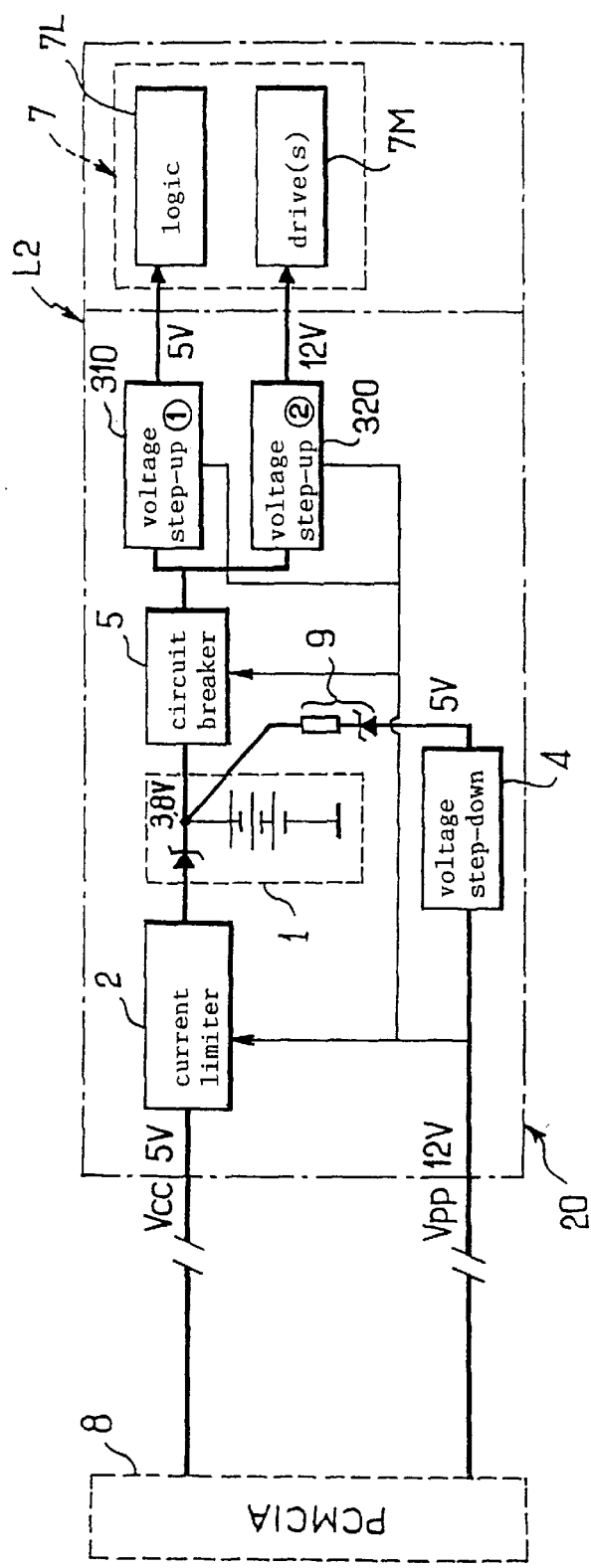
FIG_2

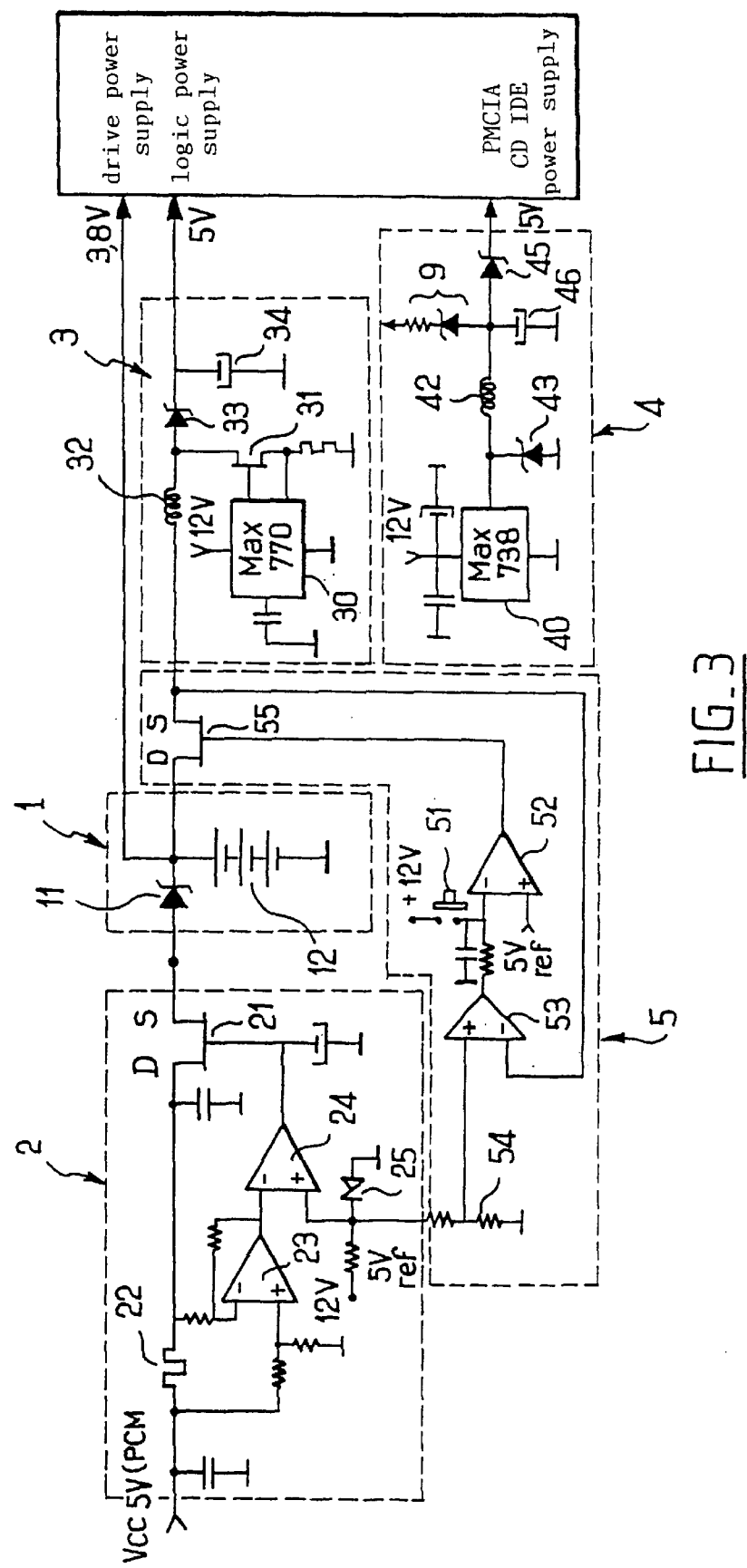
FIG_3

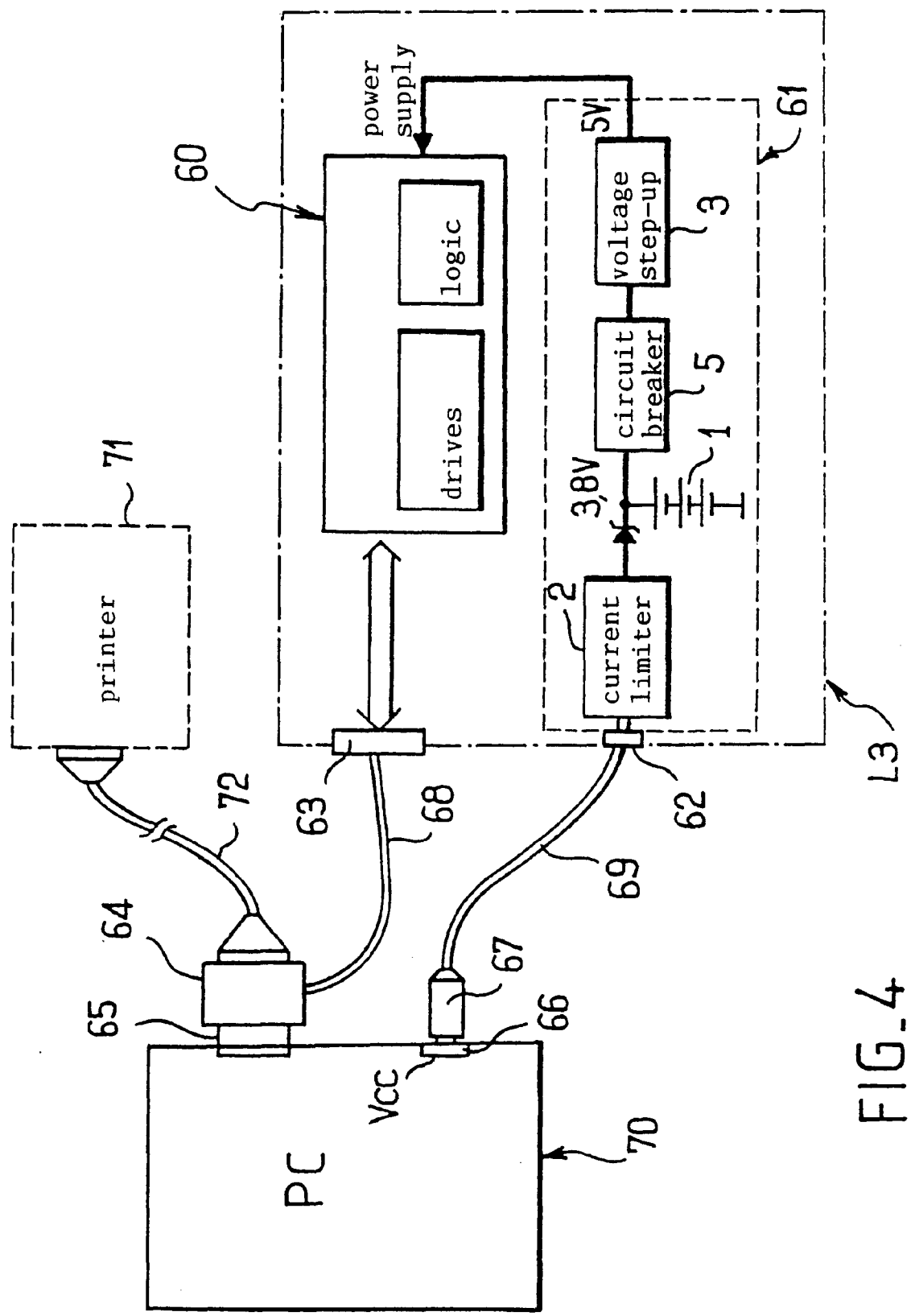
FIG_4

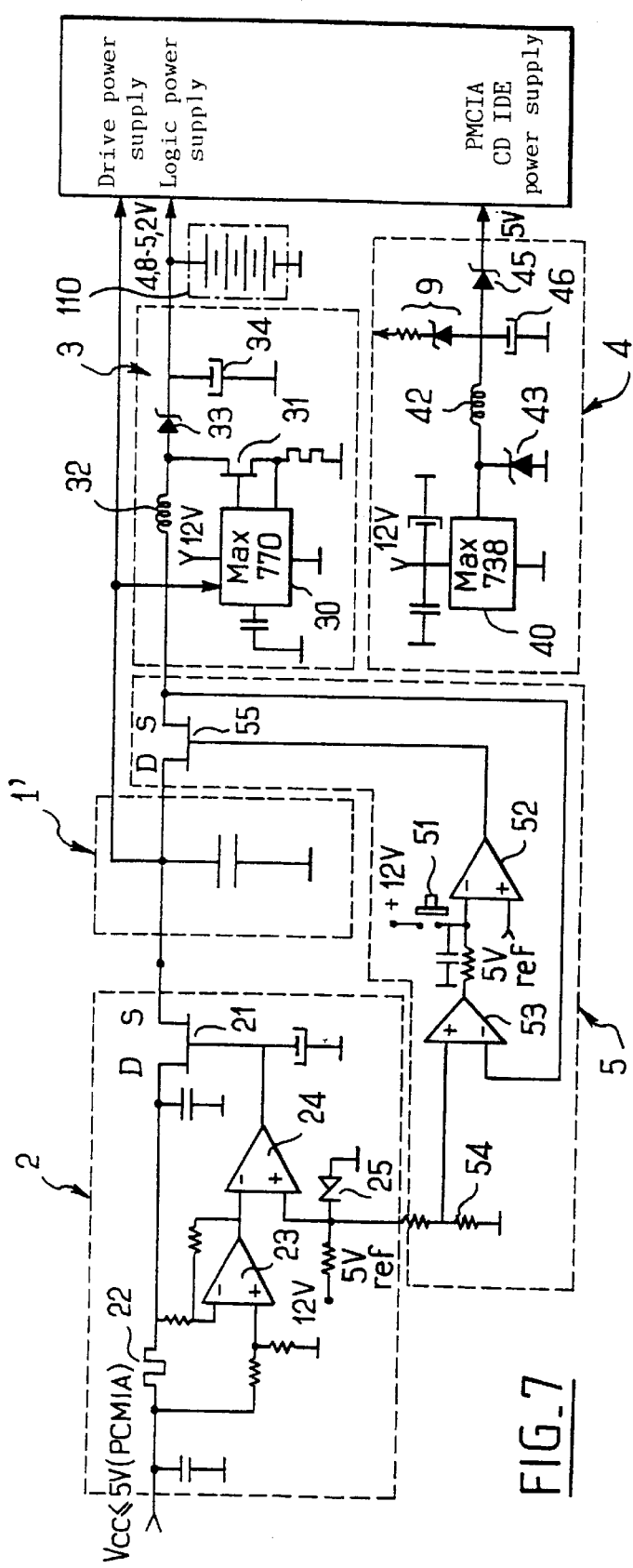
FIG_7
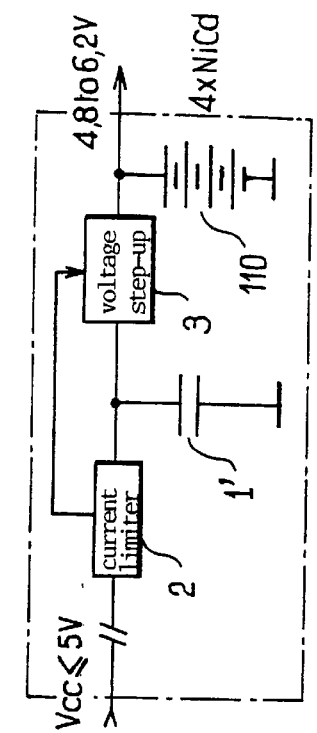
FIG_10
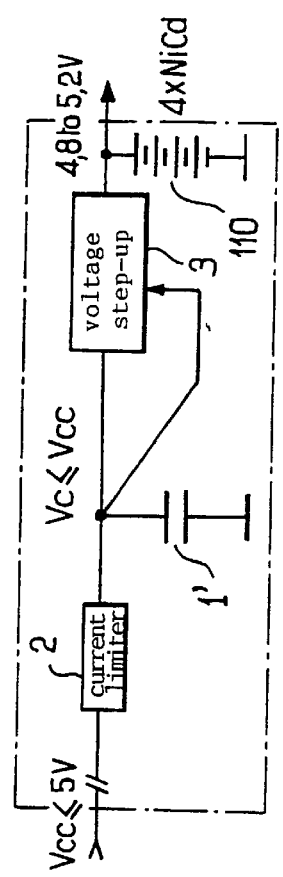
FIG_9

DEVICE AND METHOD FOR SUPPLYING POWER TO AN EXTERNAL DATA MEDIUM READER UNIT CONNECTED TO A COMPUTER, AND EXTERNAL READER UNIT INCLUDING THIS DEVICE

This application claims the benefit under 35 USC §119(e) of provisional applications Ser. Nos. 60/020,546 of Jul. 12, 1996, and 60/031,510 of Nov. 27, 1996.

BACKGROUND OF THE INVENTION

The present invention relates to a device for supplying power to an external data medium reader unit connected to a computer, in particular a microcomputer, from a port, in particular a PCMC-A port or a parallel port. It is intended more particularly for portable computers. The invention also relates to a method of supplying power used in this device, and to an external reader unit including this device.

A great difficulty in the adaptation of a hard disk and/or a CD-ROM drive to the PCMCIA port of a portable computer results from the low powers available on the power supply pins of PCMCIA ports. In order to supply these peripherals without recourse to an external power supply, two voltages are available: a general power supply voltage Vcc, equal to 5 V or to 3.3 V, and a secondary power supply voltage Vpp, equal to 12 V.

Furthermore, in the case of an external reader unit connected to a parallel port of a computer, it is in any case necessary to provide another access to the first power supply voltage source (Vcc), no power supply voltage generally being available on this type of port.

In practice, a maximum current of the order of 500 mA can be taken from the general 5 V power supply, but this current is often limited by an internal protection resistance of the order of 1 Ω. The result of this is that, when this current is taken, the output voltage is reduced to below the threshold of TTL logic: 4.75 V, which does not allow a direct supply of logic circuits of power greater than 1 W.

The maximum current permitted to be taken from the secondary 12 V power supply is most often of the order of 60 mA, with a typical internal resistance of 2 Ω.

Furthermore, these power supplies are very often protected by an internal circuit breaker whose result is either that the power supplies of the PCMCIA port are cut off, or that the computer is reinitialized as soon as the current demanded exceeds the maximum permitted value.

Now, with the increase in the performance of external reader units, and in particular in the speed of rotation of the read heads, peak current requirements become increasingly higher and the present power supply devices are not capable of meeting them.

SUMMARY OF THE INVENTION

The purpose of the invention is to overcome these disadvantages by proposing a device for the power supply of an external reader unit which does not require an additional connection to the mains, whilst being able to supply a peak current at least higher than 1 A.

The invention relates to a device for supplying power to an external data medium reader unit, in particular a CD-ROM and/or hard disk drive, connected to a computer via a first port, in particular a PCMCIA port or a parallel port, this device comprising access to a first power supply voltage source (Vcc).

According to the invention, it comprises:

means for storing energy provided by said first power supply voltage source, current limiting means connected between said first power supply voltage source and said storage means in order to limit the current supplied by the first power supply source, and first means for raising the output voltage of said storage means to a first voltage level required for the power supply of the logic components of the external reader unit.

Thus, the first power supply source, in this case the general power supply source Vcc, continuously recharges the storage means by the intermediary of a current limiter. In the case of an external reader unit connected to a PCMCIA port, this current limiting prevents the internal circuit breakers in the PCMCIA port's power supply from being tripped. The storage means voltage, which is lower than or substantially equal to the voltage source level, is then raised to 5 V by a chopper circuit of a type which is now very conventional, in what is known as a "voltage step-up" configuration. In practice, the device according to the invention allows a peak output current able to reach up to 2 A whilst taking a regular current from the first power supply voltage source, which cannot be envisaged with a direct power supply of the external reader unit from the PCMCIA port. The energy storage means can be implemented either by a buffer battery supplying a predetermined output voltage substantially lower than the nominal voltage supplied by the first power supply source, or by a capacitor at substantially the voltage level of said first power supply voltage.

In a first implementation, the device according to the invention comprises:

a buffer battery charged by the first power supply source and supplying a predetermined output voltage substantially lower than the nominal voltage supplied by the first power supply source, current limiting means connected between the first power supply voltage source and the buffer battery in order to limit the current supplied by the first power supply source, and first means for raising the output voltage of the buffer battery to a first voltage level required for the power supply of the logic components of the external reader unit.

Thus, the first power supply source, in this case the general power supply source Vcc, continuously recharges the buffer battery by the intermediary of a current limiter.

In a second implementation, the device according to the invention comprises:

means for storing energy provided by said first power supply voltage source, current limiting means connected between said first power supply voltage source and said storage means in order to limit the current supplied by the first power supply source, and first means for raising the output voltage of said storage means to a first voltage level required for the power supply of the logic components of the external reader unit.

Using a capacitor as a storage means at the input of the voltage raising means, instead of a 3.8 V buffer battery (three Ni-Cd cells), is advantageous because the capacitor voltage can be higher than 3.8 V, thus leading to a better efficiency for the voltage raising means. Moreover, the variable current surges due to the chopper effect by the voltage raising means are lower and, therefore, the cells of the buffer battery work with better conditions.

In another embodiment of a power supplying device according to the invention, the first voltage raising means are controlled as a function of the current through the current limiting means.

For both above cited implementations, in the case of an external reader unit connected to a parallel port of a computer, because of the power supply device according to the invention, it becomes possible to use the principal power supply voltage (Vcc) accessible on the computer's keyboard/mouse port.

During periods of low activity or of inactivity of the external reader unit, the buffer battery stores energy which can be retrieved in periods of intense activity, in particular when the magnetic heads of the hard disk drive or the laser head of the CD-ROM drive are moving.

In one embodiment of the power supply device according to the invention, the latter furthermore comprises means of reducing the voltage supplied by the second power supply voltage source to a level substantially equal to that required for the external reader unit, these voltage reduction means providing an additional source of energy for supplying the logic components of the external reader unit.

Thus, in addition to the energy provided by the 5V power supply, a chopper voltage reduction unit is used to reduce the 12 V voltage (second power supply source) to 5 V with performance of the same order, using a conventional circuit commonly called a "Voltage step-down" configuration. In this embodiment, it is possible to draw a much higher power and to supply a CD-ROM drive having a higher speed of rotation, paired or not paired with a hard disk drive, all operating with a 5 V supply.

In an advantageous version of the invention, the power supply device can furthermore comprise second means for raising the output voltage of the capacitor means to a second voltage level required for the power supply of the drive means of the external reader unit.

This version makes if possible to meet satisfactorily the increasingly higher power supply requirements observed with the increase in the drive speeds of reader units.

Furthermore, an advantageous option consists in providing the power supply device according to the invention with a fast charging device for the energy storage means (buffer battery or capacitor), comprising means of detecting an energy storage means output voltage level below a predetermined voltage threshold and means of breaking any connection between the energy storage means and the voltage raising means in the case of detection of an energy storage means voltage which is too low. Thus, when the voltage drops below a predetermined threshold, the buffer battery or the capacitor is automatically isolated from the voltage raising stage, the effect of which is to remove the downstream load and to force the fast charging of the capacitor from the PCMCIA port.

According to another aspect of the invention, there is proposed a method of supplying power to an external data medium reader unit, in particular a CD-ROM and/or hard disk drive, connected to a computer via a PCMCIA port, this PCMCIA port comprising an access to a first power supply voltage source (Vcc) and an access to a second power supply voltage source (Vpp), used in the power supply device according to any one of the preceding claims. According to the invention, this method, when applied to the first implementation using a buffer battery at the input of the first voltage raising means, comprises:

a continuous charging of a buffer battery from the first power supply source, this buffer battery providing a predetermined output voltage substantially lower than the nominal voltage supplied by the first power supply source, a raising of the voltage supplied by the battery to a first voltage level required for the power supply of the logic components of the external reader unit.

When applied to the second implementation using a capacitor at the input of the first voltage raising means, the method according to the invention comprises:

a continuous charging of capacitor means from the first power supply source, a limiting of the current supplied by said first power supply source, a raising of the voltage supplied by said capacitor means to a first voltage level required for the power supply of the logic components of the external reader unit, said first voltage raising being controlled as a function of said capacitor voltage, and an energy storing by a buffer battery at the output of said first raising means.

BRIEF DESCRIPTION OF THE DRAWINGS

Other features and advantages of the invention will furthermore appear in the following description. In the accompanying drawings, given by way of non-limitative examples:

FIG. 1 is a block diagram of a first embodiment of a power supply device according to the first implementation of the invention;

FIG. 2 is a block diagram of a second embodiment of a power supply device according to the first implementation of the invention, using two voltage raising circuits;

FIG. 3 shows a practical embodiment of a power supply device according to the first implementation of the invention;

FIG. 4 is a block diagram of a third embodiment of a power supply device according to the first implementation of the invention applied to an external reader unit connected to a parallel port of a computer;

FIG. 7 shows a practical embodiment of a power supply device according to the second implementation of the invention;

FIG. 9 is a block diagram of a basic embodiment of a power supply device according to the second implementation of the invention, with a voltage control; and FIG. 10 is a block diagram of a basic embodiment of a power supply device according to said second implementation of the invention, with a current control

DESCRIPTION OF THE PREFERRED EMBODIMENTS

Figure 5:
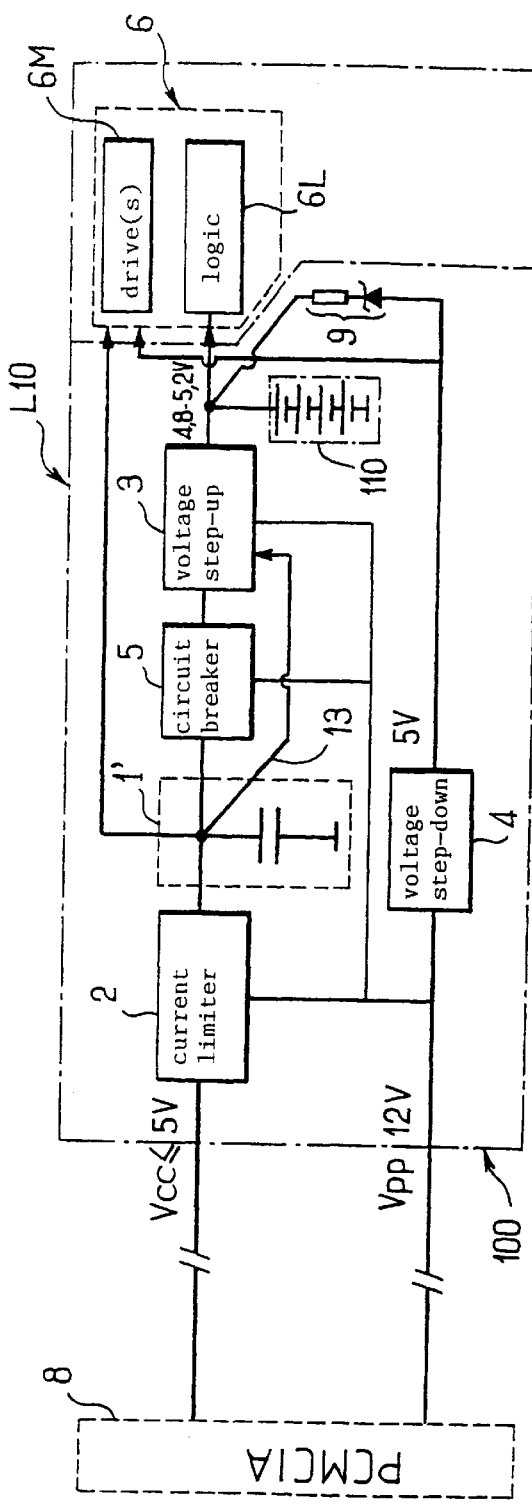
FIG. 5 is a block diagram of a first embodiment of a power supply device according to the second implementation of the invention.

In the following description, similar components or elements bear similar references.

There will now be described, with reference to the figures mentioned above, examples of embodiment of power supply devices according to said first and second implementations of the invention, applied to an external reader unit connected to a PCMCIA or a parallel port of a computer, as well as the method of power supply used in these devices.

Initially, consideration is given to an external reader unit L1 according to the invention, -a hard disk and/or CD-ROM drive-, connected to a portable computer (not shown) via a PCMCIA port 8 which normally provides access to a first power supply voltage source called the principal voltage source Vcc (5 V) and to a second power supply voltage source, called the secondary or programming voltage source, Vpp (12 V).

In a first part of said description, consideration is given to a power supply device according to said first implementation of the invention.

The external reader unit L1 includes a power supply device 10 according to the invention comprising a current limiter circuit 2 provided in order to prevent any risk of tripping internal circuit breakers in the power supply of the PCMCIA port, a buffer battery 1 consisting for example of three NiCd (Nickel-Cadmium) cells supplying an on-load voltage of between 3.8 V and 3.9 V, a voltage raising (or step-up) circuit 3 provided for supplying an output voltage of 5 V derived from the voltage of the buffer battery 1, and an automatic fast charging device 5 serving as a circuit breaker and allowing a disconnection between the buffer battery 1 and the voltage raising circuit 3. The output voltage of the voltage raising circuit 3, which is preferably produced in the form of a chopper circuit in a conventional arrangement commonly called a "voltage step-up" configuration, is provided for supplying the logic components 6L of the external reader unit 10. The drive or motorization components 6M can generally be supplied directly from the buffer battery, because they are not subjected to the constraints required by the TTL logic. The power supply device 10 preferably furthermore comprises a voltage reduction circuit 4 receiving the secondary voltage Vpp (12 V) on its input and supplying a low voltage of 5 V which can be used directly for the power supply of components of the external reader unit and/or applied to the buffer battery 1 as an additional charging source via a diode and a limiting resistor 9. It should be noted that the various circuits forming the power supply device according to the invention are in practice supplied by the secondary power supply voltage Vpp.

In a second embodiment shown in FIG. 2 wherein the elements which are the same as those in FIG. 1 bear the same references, the external reader unit L2 comprises a power supply device 20 according to the invention comprising, downstream of the automatic charging device 5, a first voltage raising circuit 310 provided for supplying the logic components 7L of the reader unit 7 at a voltage of 5 V, and a second voltage raising circuit 320 provided for supplying the drive or motorisation circuits 7M of the said reader unit 7 at a voltage of 12 V. This type of power supply device is particularly appropriate for the power supply of high speed CD-ROM drives (6× and more).

A practical embodiment of the circuits forming a power supply device according to the invention will now be described with reference to FIG. 3. In this case use is made of techniques and components which are very conventional in the field of electronics.

The current limiter circuit 2 can thus comprise a shunt resistor 22 in series in the power supply line, an amplifier 23, a comparator 24 connected such that it detects a line current excess with respect to a current reference, and a switch 21, for example an FET transistor, controlled by the comparator 24 and provided for breaking the power supply circuit in the event of an excess current demand. In this embodiment, a Zener diode 25 is provided to supply a power supply voltage reference as a reference for the comparison.

The buffer battery 1, produced from several Cd-Ni cells (in practice three in order to supply 3.8 V), is provided with a diode 11 connected upstream in order to prevent any return of current in the case in which the charge voltage of the buffer battery 1 becomes higher than the output voltage of the limiter 2.

The automatic fast charging device 5 comprises a comparator circuit 53 for comparing the output voltage of the buffer battery 1 with a voltage threshold which can be adjusted by a potentiometer 54 connected to the power supply voltage reference, and an amplifier 52 for controlling a switch 55, produced for example in the form of an FET transistor. This control amplifier 52 is connected to a manually operated fast charging control switch 51. This automatic fast charging device 5 is put into use each time that the battery voltage becomes too low. The power supply device according to the invention to is then dedicated solely to the charging of the buffer battery 1 and during this time it no longer supplies the components of the external reader unit.

The voltage raising (or step-up) circuit 3 is designed around a special integrated circuit 30, for example one referenced Max 770, performing the "voltage step-up" function and with which there is normally associated a small inductance 32 of the order of 40 μH, an FET transistor 33 having a very low internal resistance, a diode 33 and a polarised capacitor 34.

The voltage lowering circuit 4 is designed around a special integrated circuit 40, for example one referenced Max 738, supplied form the 12 V secondary power supply voltage and with which are associated, in accordance with a conventional circuit, a diode 43, a small inductance 42 and a polarised capacitor 46. The output voltage (5 V) of the step-down circuit 4 is applied, on the one hand, to the buffer battery 1 via a diode and a limiting resistor 9, and, on the other hand, via a diode 45, for the power supply of the components of the external reader unit (CD-ROM and/or hard disk).

The power supply method thus used and the various transfers of energy carried out in the power supply device according to the invention will now be described. Initially, in the absence of any current taken by the high consumption components 6M, 7M of the external reader unit L1, L2 (for example when the read heads are in the rest state), the buffer battery 1 is continuously charged, via the non-actuated limiter circuit 2, from the principal power supply source Vcc and possibly, as an additional contribution, from the secondary power supply source Vpp. The electrical energy consumed by the logic components 6L, 7L remains low and is supplied directly by the power supply sources after conversion in the voltage raising circuit. Furthermore, during periods of low activity or of inactivity of the external reader unit, the buffer battery stores energy which will be able to be retrieved in periods of intense activity.

When the high consumption components are activated (stating up the read heads), a high peak current (which can reach 2 A) is demanded and the necessary electrical energy is then supplied essentially by the buffer battery 1 which discharges progressively throughout the period of the current demand. If the battery voltage should become too low, a "shut down" mechanism is initiated with the activation of the automatic fast charging device 5. The transistor 55 is then put into cut off mode, the buffer battery becomes isolated from the voltage raising circuit 3 and rapidly becomes recharged since it no longer has to supply the current demanded downstream. When a sufficient charge voltage is again reached, the transistor 55 is put into its conducting mode and the buffer battery 1 is once again connected to the voltage raising circuit 3. It is furthermore possible to provide an alarm system, in particular an audible alarm, in order to indicate to the user of the external reader unit that the latter will no longer be supplied with power because of the weakening of the buffer battery 1.

With the use of high frequency chopper circuits (several hundred kHz), it is possible to achieve efficiencies of about 90% for the voltage raising and lowering circuits. The power supply device according to the invention allows a peak output current of up to 2 A whilst drawing a regular current from the PCMCIA port.

A power supply device according to the invention can also be included in a external reader unit provided for being connected to a computer's parallel port, as shown in FIG. 4. An external reader unit L3 comprises a reader unit 60, comprising drive devices and logic circuits and connected to an IDE connector 63, and a power supply device 61 according to the invention whose input is connected to a power supply connector 62. The computer 70 to which the external reader unit L3 is connected comprises a parallel port 65 to which is connected an IDE controller 64 of plug-like structure, possibly able to receive a cable 72 for connection to a printer 71, and a keyboard/mouse port 66, intended in particular for the connection of a mouse, to which is connected a mini-DIN type plug of a cable 69 connecting with the power supply connector 62 of the external reader unit L3. The IDE connector 64 is connected to the IDE connector 63 of the external reader unit L3. The external reader unit L3 thus has access to a power supply source through the keyboard/mouse port channel.

In the second implementation of the invention, consideration is given to an external reader unit L10 (FIG. 5) including a power supply device 100 according to the invention comprising a current limiter circuit 2 provided in order to prevent any risk of tripping internal circuit breakers in the power supply of the PCMCIA port, a capacitor 1', a voltage raising (or step-up) circuit 3 provided for supplying an output voltage of 5 V derived from the voltage of the capacitor 1', and an automatic fast charging device 5 serving as a circuit breaker and allowing a disconnection between the capacitor 1' and the voltage raising circuit 3. The output voltage of the voltage raising circuit 3, which is preferably produced in the form of a chopper circuit in a conventional arrangement commonly called a "voltage step-up" configuration, is connected to a buffer battery 110 consisting for example of four Ni-Cd (Nickel-Cadmium) cells supplying an on-load voltage of between 4.8 V and 5.2 V, and is provided for supplying the logic components 6L of the external reader unit 10. The voltage raising circuit 3 is controlled as a function of the capacitor voltage. If the capacitor voltage is lower than a reference level, e.g. 5 V, the voltage raising circuit is controlled so as to increase its output level; on the contrary, if said capacitor voltage is higher than the reference level, then the voltage raising circuit is controlled so as to decrease its output level.

The drive or motorization components 6M can generally be supplied directly from the capacitor, because they are not subjected to the constraints required by the TTL logic. The power supply device 100 preferably furthermore comprises a voltage reduction circuit 4 receiving the secondary voltage Vpp (12 V) on its input and supplying a low voltage of 5 V which can be used directly for the power supply of components of the external reader unit and/or applied to the buffer battery 110 as an additional charging source via a diode and a limiting resistor 9.

It should be noted that the various circuits forming the power supply device according to the invention are in practice supplied by the secondary power supply voltage Vpp.

With reference to FIGS. 9 and 10, a basic power supply device according to the invention can also be implemented with a minimum number of components consisting in:

the current limiter 2, the capacitor 1', the voltage raising circuit 3, controlled either by the capacitor voltage (FIG. 9), or by the current through the current limiter (FIG. 10), and the buffer battery 110.

Figure 6:
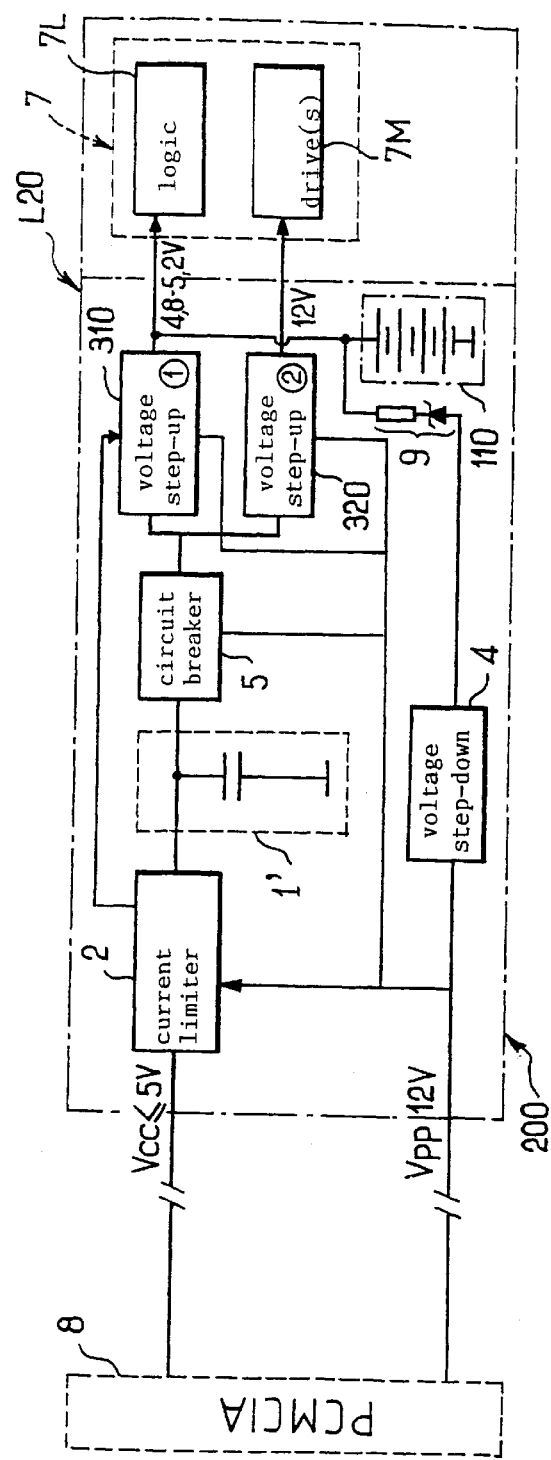
FIG. 6 is a block diagram of a second embodiment of a power supply device according to the second implementation of the invention, using two voltage raising circuits.

In a second embodiment shown in FIG. 6 wherein the elements which are the same as those in FIG. 5 bear the same references, the external reader unit L20 comprises a power supply device 200 according to the invention comprising, downstream of the automatic charging device 5, a first voltage raising circuit 310 provided for supplying the logic components 7L of the reader unit 7 at a voltage of 5 V, and a second voltage raising circuit 320 provided for supplying the drive or motorization circuits 7M of the said reader unit 7 at a voltage of 12 V. This type of power supply device is particularly appropriate for the power supply of high speed CD-ROM drives (6× and more). In this embodiment, the first voltage raising circuit 310 is controlled as a function of the current through the current limiter 2. The detection of a high current level through the current limiter leads to a control of the voltage raising circuit so as to increase its output voltage level; on the contrary, a low current level will lead to a control so as to decrease the output voltage level of the voltage raising circuit.

A practical embodiment of the circuits forming a power supply device according to the invention will now be described with reference to FIG. 7. In this case use is made of techniques and components which are very conventional in the field of electronics.

The current limiter circuit 2 can thus comprise a shunt resistor 22 in series in the power supply line, an amplifier 23, a comparator 24 connected such that it detects a line current excess with respect to a current reference, and a switch 21, for example an FET transistor, controlled by the comparator 24 and provided for breaking the power supply circuit in the event of an excess current demand. In this embodiment, a Zener diode 25 is provided to supply a power supply voltage reference as a reference for the comparison. A capacitor 1' is connected to the output of the current limiter circuit 2.

The automatic fast charging device 5 comprises a comparator circuit 53 for comparing the output voltage of the capacitor 1 with a voltage threshold which can be adjusted by a potentiometer 54 connected to the power supply voltage reference, and an amplifier 52 for controlling a switch 55, produced for example in the form of an FET transistor. This control amplifier 52 is connected to a manually operated fast charging control switch 51. This automatic fast charging device 5 is put into use each time that the capacitor voltage becomes too low. The power supply device according to the invention is then dedicated solely to the charging of the capacitor 1' and during this time it no longer supplies the components of the external reader unit.

The voltage raising (or step-up) circuit 3 is designed around a special integrated circuit 30, for example one referenced Max 770, performing the "voltage step-up" function and with which there is normally associated a small inductance 32 of the order of 40 pH, an FET transistor 33 having a very low internal resistance, a diode 33 and a polarized capacitor 34. The buffer battery 110, produced from four Cd-Ni cells, is connected to the output of the voltage raising circuit 3.

The voltage lowering circuit 4 is designed around a special integrated circuit 40, for example one referenced Max 738, supplied from the 12 V secondary power supply voltage and with which are associated, in accordance with a conventional circuit, a diode 43, a small inductance 42 and a polarized capacitor 46. The output voltage (5 V) of the step-down circuit 4 is applied, on the one hand, to the buffer battery 11 via a diode and a limiting resistor 9, and, on the other hand, via a diode 45, for the power supply of the components of the external reader unit (CD-ROM and/or hard disk).

The power supply method thus used and the various transfers of energy carried out in the power supply device according to the invention will now be described.

Initially, in the absence of any current taken by the high consumption components 6M, 7M of the external reader unit L1, L2 (for example when the read heads are in the rest state), the capacitor 1' is continuously charged, via the non-actuated limiter circuit 2, from the principal power supply source Vcc and possibly, as an additional contribution, from the secondary power supply source Vpp. The electrical energy consumed by the logic components 6L, 7L remains low and is supplied directly by the power supply sources after conversion in the voltage raising circuit, and by the buffer battery 110.

Furthermore, during periods of low activity or of inactivity of the external reader unit, the buffer battery 110 stores energy which will be able to be retrieved in periods of intense activity.

When the high consumption components are activated (starting up the read heads), a high peak current (which can reach 2 A) is demanded and the necessary electrical energy is then supplied essentially by the buffer battery 11 which discharges progressively throughout the period of the current demand. If the capacitor voltage should become too low, a "shut down" mechanism is initiated with the activation of the automatic fast charging device 5. The transistor 55 is then put in to cut off mode, the buffer battery becomes isolated from the voltage raising circuit 3 and rapidly becomes recharged since it no longer has to supply the current demanded downstream. When a sufficient charge voltage is again reached, the transistor 55 is put into its conducting mode and the capacitor 1' is once again connected to the voltage raising circuit 3. It is furthermore possible to provide an alarm system, in particular an audible alarm, in order to indicate to the user of the external reader unit that the latter will no longer be supplied with power.

Figure 8:
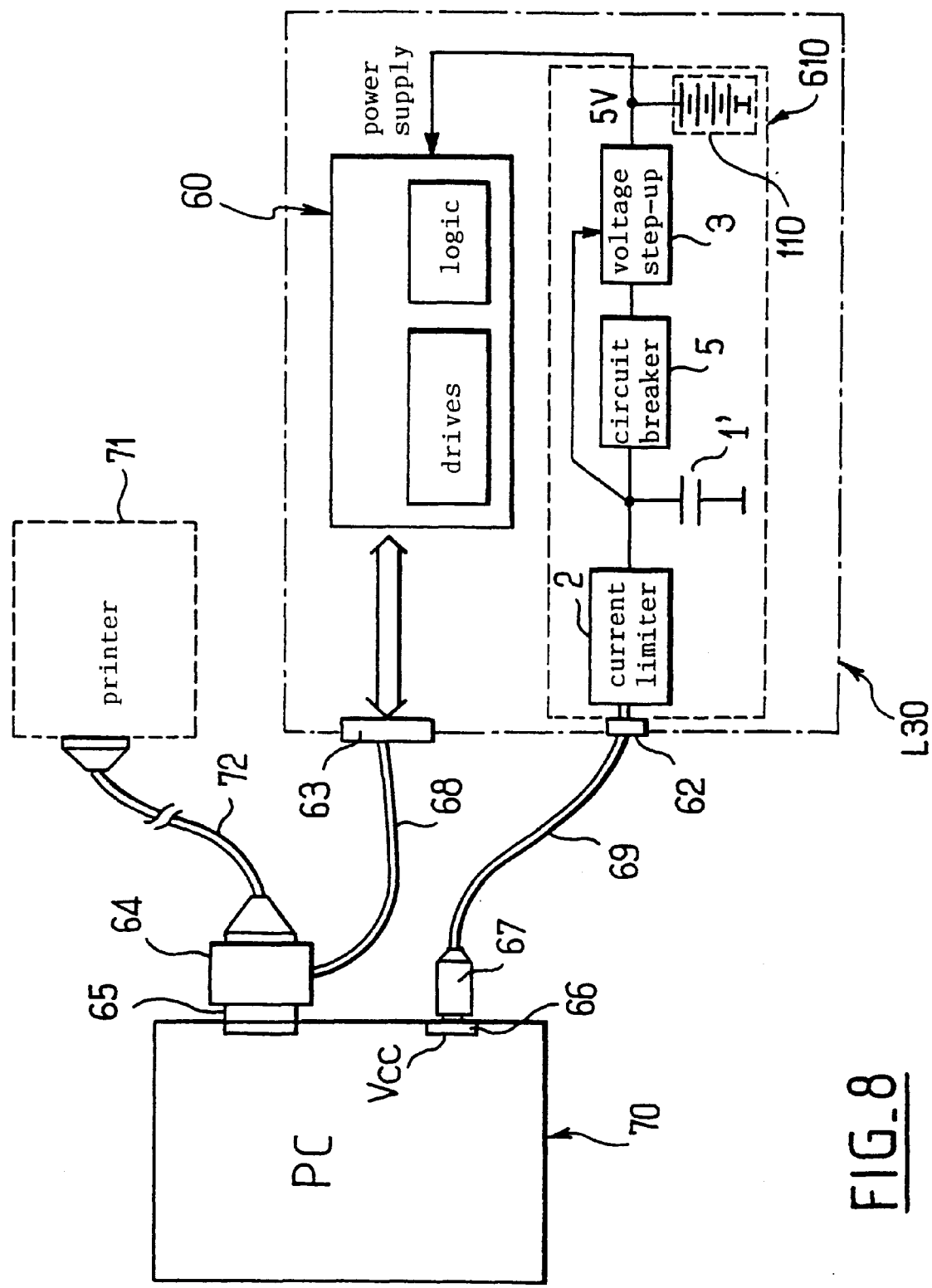
FIG. 8 is a block diagram of a third embodiment of a power supply device according to the second implementation of the invention, applied to an external reader unit connected to a parallel port of a computer.

A power supply device according to the invention can also be included in an external reader unit provided for being connected to a computer's parallel port, as shown in FIG. 8. An external reader unit L3' comprises a reader unit 60, comprising drive devices and logic circuits and connected to an IDE connector 63, and a power supply device 610 according to the invention whose input is connected to a power supply connector 62.

The power supply device 610 includes a current limiter 2, a capacitor 1', a circuit breaker 5, a voltage step-up circuit 3 and a buffer battery 110. The voltage step-up circuit is controlled as a function of the capacitor voltage. In another embodiment, such control could otherwise be achieved as a function of the current through the current limiter.

The invention is not of course limited to the examples which have just been described and many developments can be applied to these examples without departing from the scope of the invention. Thus, the voltage raising and lowering means can be produced using many techniques other than those described here. The same applies to the buffer battery whose number of cells and whose technology can depend on the respective voltage levels of the general power supply of the computer and on the logic and drive components of the external reader unit.

I claim:

1. A device for supplying power from a first power supply voltage source within a computer to an external data medium reader unit connected to the computer via a first port, comprising:

energy storage means for storing energy provided by the first power supply voltage source;

current limiting means connected between the first power supply voltage source and said energy storage means for limiting a current supplied by the first power supply voltage source; and first means for raising an output voltage from said energy storage means and from said current limiting means to a first voltage level (5 V) required for logic components of the external reader unit.

2. The power supply device according to claim 1, further comprising second means for raising the output voltage of said energy storage means to a second voltage level (12 V) required for drive means of the external reader unit.

3. The power supply device according to claim 1, further comprising an automatic fast charging device for said energy storage means, which comprises means for detecting the output voltage of said energy storage means that below a predetermined voltage threshold and switching means for breaking a connection between said energy storage means and said voltage raising means when the output voltage of said energy storage means is too low.

4. The power supply device according to claim 3, wherein said automatic fast charging device comprises means for controlling said switching means.

5. The power supply device according to claim 1, further comprising second connection means for providing access to the first power supply voltage source via a mouse/keyboard port of the computer.

6. The power supply device according to claim 1, wherein said energy storage means comprises a buffer battery charged by the first power supply voltage source and supplying a predetermined output voltage substantially lower than the nominal voltage supplied by the first power supply voltage source.

7. The power supply device according to claim 1, wherein said energy storage means comprises capacitor means for storing energy provided by the first power supply voltage source at substantially a voltage level of said first power supply voltage, and further comprising a buffer battery connected to an output of said first raising means for substantially maintaining the output voltage of said first raising means to said first voltage level.

8. The power supply device according to claim 7, wherein said first voltage raising means are controlled as a function of a current through said current limiting means.

9. The power supply device according to claim 1, comprising access to the first power supply voltage source, access to a second power supply voltage source, and means for lowering a voltage supplied by the second power supply voltage source to a level substantially equal to that required for a power supply of the external reader unit.

10. The power supply device according to claim 9, wherein said voltage lowering means are connect to said energy storing means and supply an additional source of charging energy thereto.

11. A method of supplying power from a first power supply voltage source within a computer to an external data medium reader unit connected to the computer via a first port using a power supply device, the method comprising the steps of:

continuously charging an energy store in the power supply device from the first power supply voltage source;

limiting a current supplied by the first power supply source to the energy store; and raising a voltage supplied by the energy store to a first voltage level (5 V) required for logic components of the external reader unit.

12. The method according to claim 11, further comprising the step of charging a buffer battery that receives the voltage raised to the first voltage level.

13. The method according to claim 11, further comprising the step of raising the voltage supplied by the first power supply voltage source to a second voltage level (12 V) required for drive means of the external reader unit.

14. The method according to claim 11, further comprising the step of automatically fast charging the energy store by detecting an energy store voltage level lower than a predetermined voltage threshold, and breaking a connection from the energy store.

15. The method according to claim 11, wherein the first port is a PCMCIA port of the computer, this PCMCIA port providing access to the first power supply voltage source and access to a second power supply voltage source.

16. The method according to claim 15, further comprising the step of lowering the voltage supplied by the second power supply voltage source, to a level required for a power supply of the external reader.

17. The method according to claim 16, further comprising an additional supply of energy for charging the energy store, derived from the lowered voltage.

18. The method according to claim 11, wherein the first port is a parallel port of the computer, and wherein the first power supply voltage source is accessed via a keyboard/mouse port of the computer.

* * * * *